(12) United States Patent
Nallamalli et al.

(10) Patent No.: US 11,263,032 B1
(45) Date of Patent: Mar. 1, 2022

(54) SYSTEMS AND METHODS FOR EMULATING LOCAL STORAGE

(71) Applicant: Veritas Technologies LLC, Mountain View, CA (US)

(72) Inventors: Nalini Kumari Nallamalli, Andhra Pradesh (IN); Utkarsh Naiknaware, Pune (IN); Raosaheb Jadhav, Sangli (IN); Kushal Kumaran, Cupertino, CA (US); Anindya Banerjee, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 805 days.

(21) Appl. No.: 15/942,070

(22) Filed: Mar. 30, 2018

(51) Int. Cl.
*G06F 9/455* (2018.01)
*G06F 3/06* (2006.01)

(52) U.S. Cl.
CPC ........ *G06F 9/45508* (2013.01); *G06F 3/0614* (2013.01); *G06F 3/0659* (2013.01); *G06F 3/0673* (2013.01); *G06F 9/45558* (2013.01); *G06F 2009/45583* (2013.01)

(58) Field of Classification Search
CPC ........ G06F 3/067; G06F 3/065; G06F 3/0689; G06F 11/2094; G06F 16/188; G06F 3/0667; G06F 13/28; G06F 9/455; G06F 3/06; G06F 17/30; G06F 12/08
See application file for complete search history.

(56) References Cited

U.S. PATENT DOCUMENTS

| | | | | |
|---|---|---|---|---|
| 5,146,568 | A * | 9/1992 | Flaherty ................ | G06F 9/4416 703/24 |
| 9,686,171 | B1 * | 6/2017 | Vemuri ............... | H04L 43/0876 |
| 9,965,378 | B1 * | 5/2018 | Weiner .................... | H04L 67/02 |
| 10,284,645 | B1 * | 5/2019 | Thiam ................... | G06F 13/287 |
| 2005/0289218 | A1 * | 12/2005 | Rothman ............. | G06F 3/0664 709/203 |
| 2013/0125122 | A1 * | 5/2013 | Hansen ................. | G06F 16/178 718/1 |

(Continued)

OTHER PUBLICATIONS

Valeria Cardellini Distributed and Cloud Storage Systems SDCC, A.A. 2017/2018 (Year: 2017).*

(Continued)

*Primary Examiner* — Justin C Mikowski
*Assistant Examiner* — Cuong V Luu
(74) *Attorney, Agent, or Firm* — FisherBroyles, LLP

(57) ABSTRACT

The disclosed computer-implemented method for emulating local storage may include (i) exposing a cloud storage as a local block storage device by providing a translation service that translates commands formatted according to an operating system compatibility standard protocol into commands formatted according to a cloud storage application programming interface protocol, the cloud storage dividing a cloud storage volume into multiple objects, (ii) receiving a command that is formatted according to the operating system compatibility standard protocol and that specifies a length and offset of the cloud storage volume, (iii) translating the command into a translated command formatted according to the cloud storage application programming interface protocol, and (iv) returning a result of executing the translated command. Various other methods, systems, and computer-readable media are also disclosed.

20 Claims, 4 Drawing Sheets

(56) References Cited

U.S. PATENT DOCUMENTS

2014/0006465 A1* 1/2014 Davis .................... G06F 16/183
707/827
2017/0131928 A1* 5/2017 Cui ...................... G06F 3/0665

OTHER PUBLICATIONS

Xu et al. Enabling Cloud Storage to Support Traditional Applicantions The Fifth Annyal China Grid Conference, IEEE 2010 (Year: 2010).*
Suciu et al. Cloud Computing as Evolution of Distributed Computing—A Case Study for SlapOS Distributed Cloud Computing Platform Informatica Economica vol. 17, No. Apr. 2013 (Year: 2013).*
Conner et al. Cloud Storage: Adoption, Practice and Deploymnet StorageStratefies NOW, Apr. 4, 2011 (Year: 2011).*
Ballis et al. Quantifying Eventual Consistency with PBS VLDB Journal, 2014 23 pp. 279-302 (Year: 2014).*

* cited by examiner

SYSTEMS AND METHODS FOR EMULATING LOCAL STORAGE

BACKGROUND

Customers of enterprise data storage vendors generally seek to minimize the costs of mass data storage. Along these lines, some of these customers have noticed that data stored on premise within a local storage area network may potentially be relocated to lower cost remote cloud storage over the Internet. Nevertheless, relocating the data from the local storage area network on premise over to the remote cloud storage that is accessed over the Internet may increase complexity. This migration may also introduce complications associated with migration, because the cloud storage may use a different configuration, user interface, and/or application programming interface than the local storage area network on premise. Accordingly, these customers may seek a solution that both enjoys the lower cost of remote cloud storage over the Internet while also minimizing the complexity and complications associated with migrating to the remote cloud storage. The instant disclosure, therefore, identifies and addresses a need for systems and methods for emulating local storage.

SUMMARY

As will be described in greater detail below, the instant disclosure describes various systems and methods for emulating local storage. In one example, a computer-implemented method for emulating local storage may include (i) exposing a cloud storage as a local block storage device by providing a translation service that translates commands formatted according to an operating system compatibility standard protocol into commands formatted according to a cloud storage application programming interface protocol, the cloud storage dividing a cloud storage volume into multiple objects, (ii) receiving a command that is formatted according to the operating system compatibility standard protocol and that specifies a length and offset of the cloud storage volume, (iii) translating the command into a translated command formatted according to the cloud storage application programming interface protocol, (iv) translating the length and offset into information indicating a different length and offset in reference to at least one object within the cloud storage volume rather than referencing the cloud storage volume itself, and (v) returning a result of executing the translated command that is formatted according to the cloud storage application programming interface protocol and that specifies, as a parameter, the information indicating the different length and offset in reference to the object within the cloud storage volume.

In one embodiment, the operating system compatibility standard protocol may include the PORTABLE OPERATING SYSTEM INTERFACE. In one embodiment, the command that is formatted according to the operating system compatibility standard protocol may include (i) a read command, (ii) a write command, and/or (iii) a reclaim command. In one embodiment, the operating system compatibility standard protocol may include a variant of the PORTABLE OPERATING SYSTEM INTERFACE that was derived from the PORTABLE OPERATING SYSTEM INTERFACE.

In one embodiment, the cloud storage application programming interface protocol may include the REPRESENTATIONAL STATE TRANSFER protocol. In one embodiment, the translated command formatted according to the cloud storage application programming interface protocol may include (i) a GET command, (ii) a PUT command, and/or (iii) a DELETE command.

In some examples, translating the length and offset may include translating the length and offset into both a second length and offset for a first object and a third length and offset for a second object.

In one embodiment, the cloud storage volume includes a thin reclaimable volume. In one embodiment, the cloud storage divides the cloud storage volume into multiple objects of uniform length. In one embodiment, the uniform length of the multiple objects is identical to a block length of the local block storage device.

In one embodiment, the translation service enables direct execution of at least one of the following commands on a volume manager: (i) a mirroring command, (ii) a snapshot command, and/or (iii) an encryption command. In one embodiment, the translation service is cloud storage agnostic such that the translation service is compatible with multiple cloud storage vendors.

In one embodiment, the translation service references objects in terms of both a unique number assigned to each respective object and an incrementing number assigned to each respective object that increments from object to object. In one embodiment, the unique number assigned to each respective object enables the cloud storage to provide data storage that satisfies a strict consistency protocol rather than an eventual consistency protocol.

In one embodiment, the cloud storage provides data storage that satisfies an eventual consistency protocol rather than a strict consistency protocol. In some examples, returning a result of executing the translated command may include checking whether an object referenced by the translated command exists. In some examples, returning the result of executing the translated command may include returning random data in response to determining that the object referenced by the translated command does not exist. In some examples, returning the result of executing the translated command may include returning data fetched from the object referenced by the translated command in response to determining that the object referenced by the translated command does exist.

In one embodiment, a system for implementing the above-described method may include (i) an exposure module, stored in memory, that exposes a cloud storage as a local block storage device by providing a translation service that translates commands formatted according to an operating system compatibility standard protocol into commands formatted according to a cloud storage application programming interface protocol, the cloud storage dividing a cloud storage volume into multiple objects, (ii) a reception module, stored in memory, that receives a command that is formatted according to the operating system compatibility standard protocol and that specifies a length and offset of the cloud storage volume, (iii) a translation module, stored in memory, that (a) translates the command into a translated command formatted according to the cloud storage application programming interface protocol and (b) translates the length and offset into information indicating a different length and offset in reference to at least one object within the cloud storage volume rather than referencing the cloud storage volume itself, (iv) a returning module, stored in memory, that returns a result of executing the translated command that is formatted according to the cloud storage application programming interface protocol and that specifies, as a parameter, the information indicating the different length and offset in reference to the object within the cloud storage volume, and (v) at least one physical processor configured to execute the exposure module, the reception module, the translation module, and the returning module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) expose a cloud storage as a local block storage device by providing a translation service that translates commands formatted according to an operating system compatibility standard protocol into commands formatted according to a cloud storage application programming interface protocol, the cloud storage dividing a cloud storage volume into multiple objects, (ii) receive a command that is formatted according to the operating system compatibility standard protocol and that specifies a length and offset of the cloud storage volume, (iii) translate the command into a translated command formatted according to the cloud storage application programming interface protocol, (iv) translate the length and offset into information indicating a different length and offset in reference to at least one object within the cloud storage volume rather than referencing the cloud storage volume itself, and (v) return a result of executing the translated command that is formatted according to the cloud storage application programming interface protocol and that specifies, as a parameter, the information indicating the different length and offset in reference to the object within the cloud storage volume.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
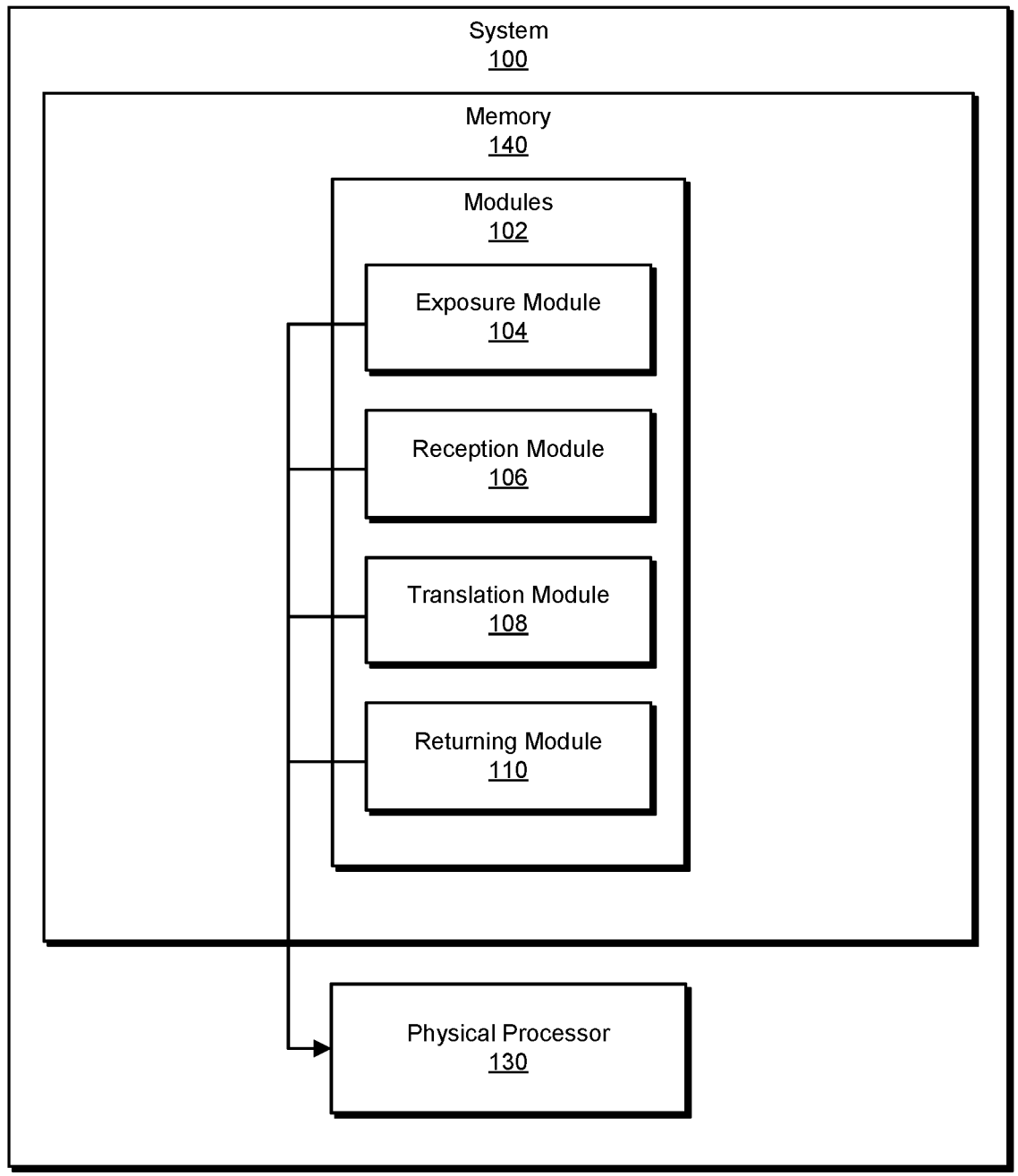
FIG. 1 is a block diagram of an example system for emulating local storage.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for emulating local storage. The disclosed subject matter may enable a customer of an enterprise data storage vendor to enjoy lower costs associated with remote cloud storage over the Internet while also preserving a user interface and application programming interface with which the customer is familiar when interacting with a local storage area network on premise. The disclosed subject matter may also provide one or more additional benefits to the customer, which are discussed in more detail below.

Figure 2:
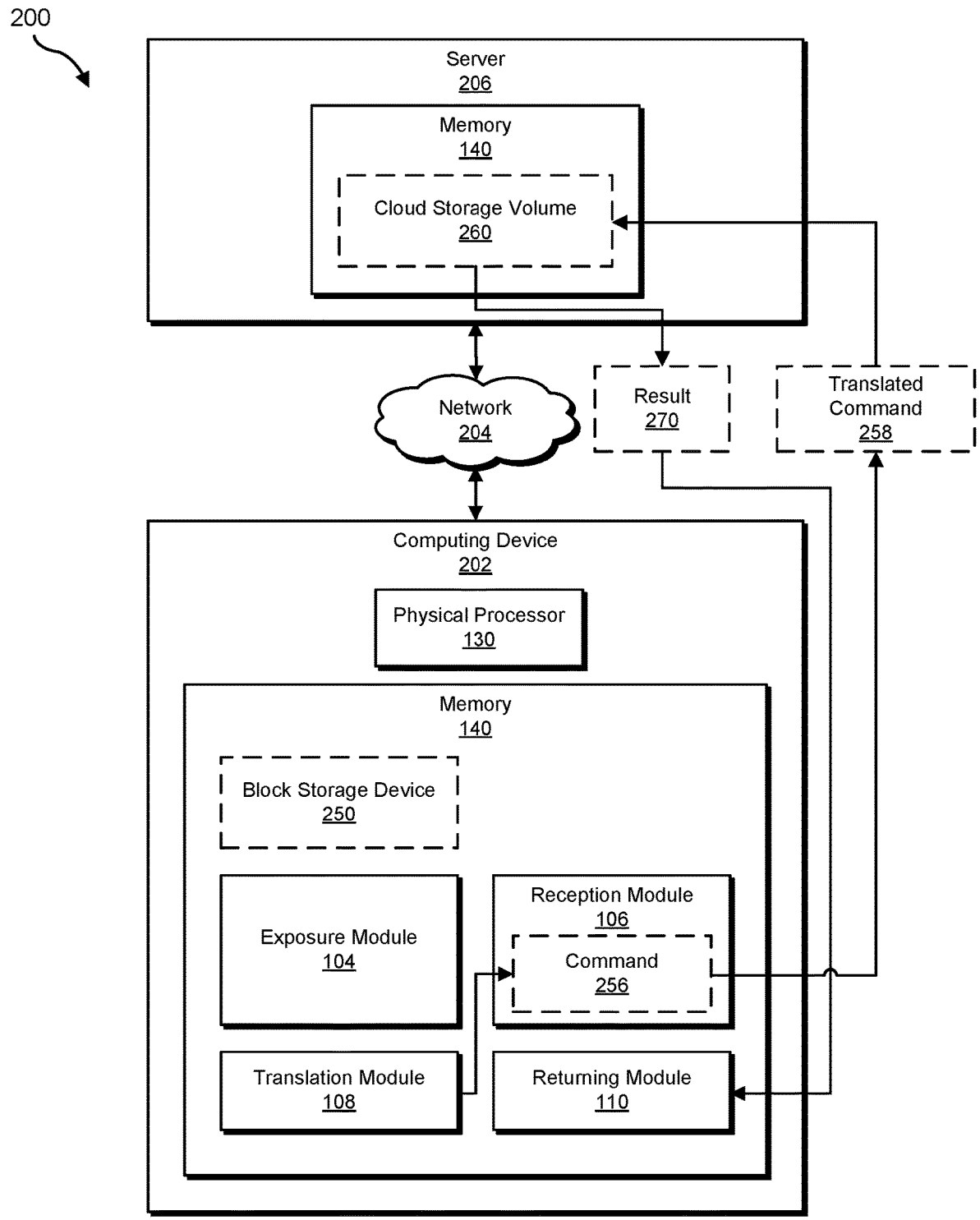
FIG. 2 is a block diagram of an additional example system for emulating local storage.

The following will provide, with reference to FIGS. 1-2, detailed descriptions of example systems for emulating local storage. Detailed descriptions of corresponding computer-implemented methods will also be provided in connection with FIGS. 3-4.

FIG. 1 is a block diagram of example system 100 for emulating local storage. As illustrated in this figure, example system 100 may include one or more modules 102 for performing one or more tasks. For example, and as will be explained in greater detail below, example system 100 may include an exposure module 104 that exposes a cloud storage as a local block storage device by providing a translation service that translates commands formatted according to an operating system compatibility standard protocol into commands formatted according to a cloud storage application programming interface protocol. The cloud storage may divide a cloud storage volume into multiple objects. Example system 100 may additionally include a reception module 106 that receives a command that is formatted according to the operating system compatibility standard protocol and that specifies a length and offset of the cloud storage volume.

Example system 100 may also include a translation module 108 that translates the command into a translated command formatted according to the cloud storage application programming interface protocol. Translation module 108 may also translate the length and offset into information indicating a different length and offset in reference to at least one object within the cloud storage volume rather than referencing the cloud storage volume itself. Example system 100 may additionally include a returning module 110 that returns a result of executing the translated command that is formatted according to the cloud storage application programming interface protocol and that specifies, as a parameter, the information indicating the different length and offset in reference to the object within the cloud storage volume. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate emulating local storage. Examples of physical processor 130 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to emulate local storage.

Computing device 202 generally represents any type or form of computing device capable of reading computer-executable instructions. Illustrative examples of computing device 202 may include a client device or workstation used by, or assigned to, an employee within a corporate enterprise organization. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, or any other suitable computing device.

Server 206 generally represents any type or form of computing device that is capable of performing method 300 of FIG. 3, as discussed further below, or facilitating the performance of this method. In one illustrative example, server 206 may correspond to a server of a cloud storage vendor. Additional examples of server 206 include, without limitation, storage servers, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
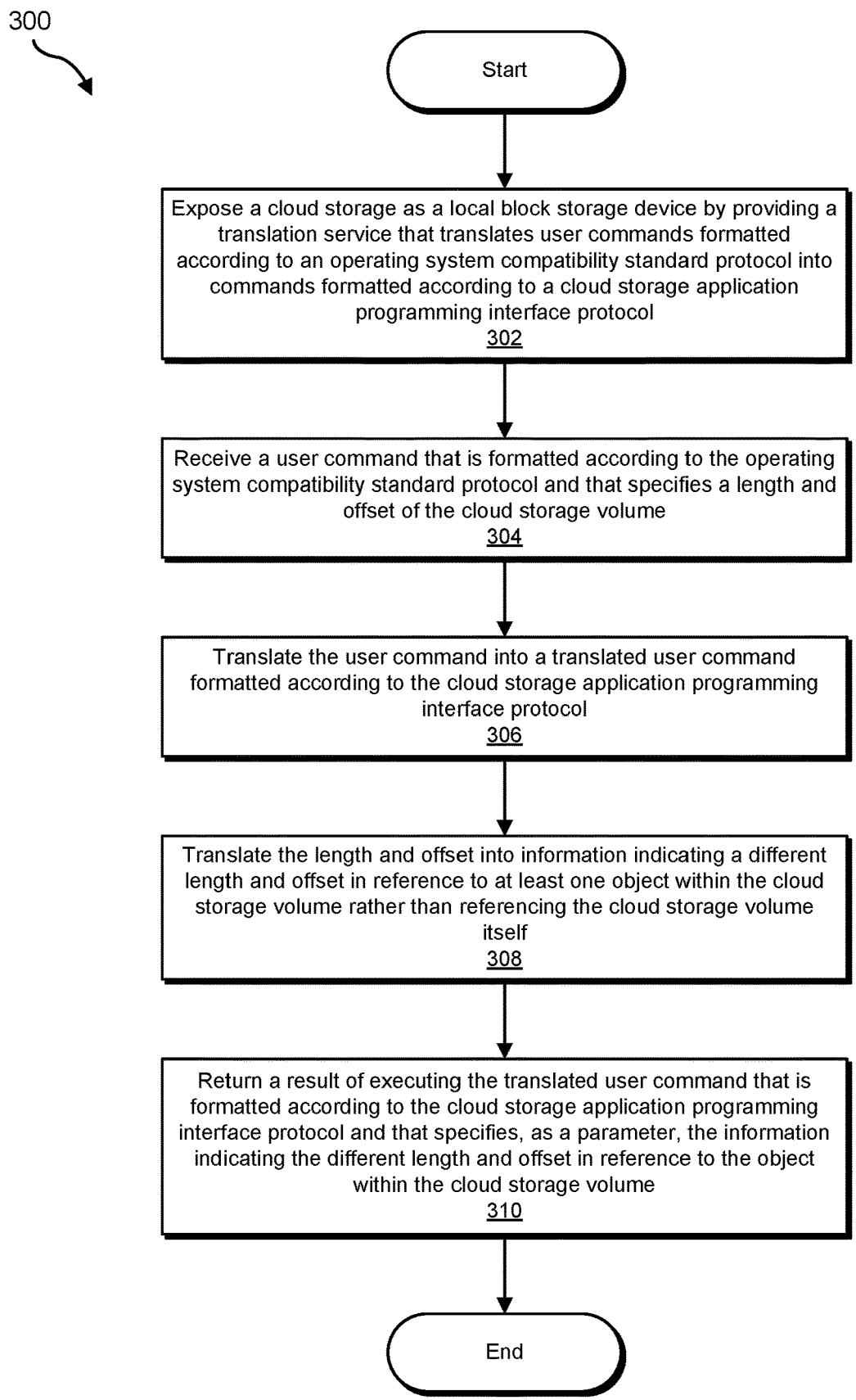
FIG. 3 is a flow diagram of an example method for emulating local storage.

FIG. 3 is a flow diagram of an example computer-implemented method 300 for emulating local storage. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may expose a cloud storage as a local block storage device by providing a translation service that translates commands formatted according to an operating system compatibility standard protocol into commands formatted according to a cloud storage application programming interface protocol. The cloud storage may divide a cloud storage volume into multiple objects. The cloud storage volume may include a thin reclaimable volume. The translation service may enable thin provisioning and corresponding reclamation operations on the cloud storage volume despite the fact that it is exposed as a local block storage device. For example, exposure module 104 may, as part of computing device 202 in FIG. 2, expose a cloud storage, such as a cloud storage managed by server 206, as a local block storage device, such as a block storage device 250, by providing a translation service, within translation module 108, that translates commands formatted according to an operating system compatibility standard protocol into commands formatted according to a cloud storage application programming interface protocol. In one embodiment, the translation service is cloud storage agnostic such that the translation service is compatible with multiple cloud storage vendors.

In further examples, the cloud storage provides data storage that satisfies an eventual consistency protocol rather than a strict consistency protocol. As used herein, the term "eventual consistency protocol" generally refers to a protocol that specifies that a node or a server may return an indication that a write operation was successful after the write operation has been successfully performed on the node or server (e.g., on the primary node or primary server) but before the write operation has been successfully replicated to a secondary node or server (e.g., any remaining nodes within a cluster of nodes for performing replication). In this case, there is a risk that data may become lost if the primary node or server fails, because there will be a window of time during which the data has not yet been successfully replicated to the secondary node or server. In contrast, the term "strict consistency protocol" generally refers to a protocol that specifies that the node or server may only return an indication that the write operation was successful after the write operation has been successfully performed on both the original node or server, as well as the secondary nodes or servers to which the write operation is being replicated. In other words, the cloud storage provides data storage that may return a result of executing the original command (e.g., at step 310 of method 300 of FIG. 3, as discussed further below) prior to ensuring that the original command is successfully executed on some or all of the other parallel instances of the target volume (and/or target objects within the volume) that are stored for purposes of redundancy and data durability. Instead, the cloud storage may return a result of executing the original command immediately, and the original command may be propagated to the other instances of the target volume afterward.

In some examples, the cloud storage may provide data storage that satisfies the eventual consistency protocol because the cloud storage includes, or is compatible with, AMAZON S3 cloud storage. For example, AMAZON S3 may optionally provide strict consistency for PUTS of new objects in an S3 bucket in all regions with one caveat. The caveat is that if a HEAD or GET request is issued to the key name (to find if the object exists) before creating the object, then AMAZON S3 optionally provides eventual consistency for corresponding read operations.

In general, as used herein, the terms "object" and "object storage" refer to a cloud storage that stores data according to the principles of object storage as distinct from both "block storage" and/or "file system storage." As distinct from block storage, object storage may store data at a level of abstraction that does not divide data into multiple blocks (e.g., blocks of uniform length) but instead stores data in containers or buckets called "objects." In general, each object, as used herein, includes three separate parts: (i) the underlying data or data payload of the object, (ii) metadata describing the underlying data in an application-agnostic manner, which is readable and/or parsable by the object storage, and (iii) a unique name or identifier which enables a user or application to locate and download the corresponding object. Object storage is typically associated with cloud storage vendors such as AMAZON S3. Object storage may be preferable in scenarios where data is frequently the target of read operations but not the target of frequent write operations, such as multimedia content, which is typically unchanging (e.g., online photos, music, and/or video stored in the cloud).

In contrast, block storage is typically associated with local storage devices, such as local or peripheral hard drives, hard disks, and/or flash memory. Block storage divides objects, such as files, into blocks that are processed by the block storage, such as a hard drive, hard drive interface, and/or corresponding operating system. In general, the blocks may have a fixed size or length. Moreover, the block storage system may operate (e.g., only operate) on individual blocks at a time such that if an operation is performed on a file, and if the operation references data stored within multiple blocks of the file, then the block storage must retrieve each of the multiple blocks and perform individual operations on each block in order to complete the overall operation. In contrast, any operation to write to an object stored within an object storage generally involves processing the entire object rather than simply processing a smaller, divisible unit within the object. Moreover, according to principals of block storage, the hard drive and/or hard drive interface may only store metadata that enables the hard drive to locate and/or reproduce the corresponding file, without further storing any metadata describing attributes about the meaning of the content of the data, such as an artist name or identifier that created the music stored within the file and/or a director name or identifier who directed a video stored within the file. Rather, the second kind of metadata may only be stored and parsed at the application level rather than the lower block storage level.

In general, the disclosed subject matter may operate on a principle of emulating block storage by leveraging cloud storage as a backend. In some examples, the disclosed subject matter may achieve this solution by dividing cloud storage into objects, according to the principles of object storage, such that the objects have a fixed size that corresponds to, or matches exactly, the block size of the emulated block storage device. The disclosed subject matter may then store data within the cloud storage, according to the principles of block storage, where each object corresponds to a block of the emulated block storage, despite the fact that the cloud storage is originally configured to operate according to the principles of object storage rather than block storage. In other words, the disclosed subject matter may reengineer cloud storage to emulate block storage in a manner that achieves benefits associated with cloud storage, including lower cost, while also preserving an interface, configuration, and/or command associated with the local block storage device. Matching the sizes of the objects created within the cloud storage according to principles of object storage to the size of an emulated block storage device may enable the corresponding system, such as system 100 or 200 (and the corresponding translation service) to emulate the local block storage device using the cloud storage, with its objects maintained according to principles of object storage, as a backend. Moreover, the disclosed subject matter may, in general, achieve the simulation by translating commands that are formatted according to a protocol for the local block storage device into one or more corresponding commands that are formatted according to a protocol for the cloud storage, which is originally configured according to the principles of object storage, as further discussed above.

As used herein, the term "expose" simply refers to providing an interface to interact with an emulation of a local block storage device that leverages a cloud storage as a backend resource for storing data. In other words, the term "expose" refers to the simulation, evolution, and/or appearance of a local block storage device that is actually sourced using remote cloud storage that is configured according to the principles of object storage.

Exposure module 104 may expose a cloud storage as a local block storage device by providing a translation service that translates commands formatted according to an operating system compatibility standard protocol into commands formatted according to a cloud storage application programming interface protocol.

Exposure module 104 may expose the cloud storage as the local block storage device in a variety of ways. In general, exposure module 104 may expose the cloud storage as the local block storage device by providing the translation service. The translation service may enable the corresponding computing device, such as computing device 202, to emulate the local block storage device despite using the remote cloud storage as a backend. As used herein, the term "cloud storage" generally refers to mass storage services provided by a hosting company, in which digital data is stored in logical pools, the physical storage spans multiple servers, and the physical environment is owned and managed by the hosting company. In contrast, as used herein, the term "local block storage device" generally refers to a real or emulated local device at a computing system that stores data according to block storage principles.

In one example, the translation service may translate one or more commands that are formatted according to the PORTABLE OPERATING SYSTEM INTERFACE or POSIX protocol. The POSIX protocol may share compatibility between different UNIX-type operating systems. In additional or alternative examples, the translation service may translate one or more commands that are formatted according to an operating system compatibility protocol that is a variation of the POSIX protocol and that is derived from the POSIX protocol. In these examples, the command that is formatted according to the operating system compatibility standard protocol may include at least one of (i) a read command, (ii) a write command, and/or (iii) a reclaim command.

In contrast, the translation service may translate one or more of the above-described commands, which are formatted according to the operating system compatibility standard protocol into a cloud storage application programming interface protocol that includes the REPRESENTATIONAL STATE TRANSFER, REST, or RESTFUL protocol. In additional or alternative examples, the cloud storage application programming interface protocol refers to any protocol for executing commands to remotely read, write, and/or delete data over a wide area network when the data is stored within a cloud storage network. In some examples, the cloud storage application programming interface may correspond to, or be described as, web services. In some examples, commands executed over the cloud storage application programming interface protocol may be transmitted using the HYPERTEXT TRANSFER PROTOCOL. In these examples, the translated command formatted according to the cloud storage application programming interface protocol may include at least one of: (i) a GET command, (ii) a PUT command, and/or (iii) a DELETE command.

At step 304, one or more of the systems described herein may receive a command that is formatted according to the operating system compatibility standard protocol and that specifies a length and offset of the cloud storage volume. For example, reception module 106 may, as part of computing device 202 in FIG. 2, receive a command 256 that is formatted according to the operating system compatibility standard protocol and that specifies a length and offset of a cloud storage volume 260.

Reception module 106 may receive the command that is formatted according to the operating system compatibility standard protocol in a variety of ways. In some examples, reception module 106 may receive the command from a user. In other words, a human user may be interacting with a client device and may enter the command to a user interface. In some examples, the human user may correspond to an employee of a corporate enterprise organization. The corporate enterprise organization may be a customer of a cloud storage vendor, as further discussed above. Additionally or alternatively, reception module 106 may receive the command from a user account. The user account may be manually operated by a human user or, instead, may simply be operated by an application, scripts, and/or software module.

Figure 4:
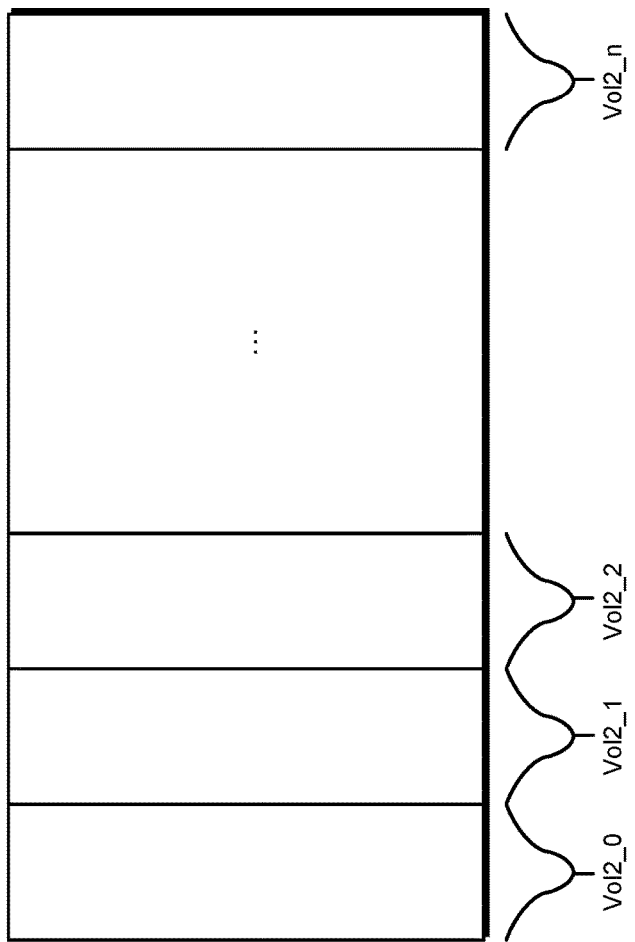
FIG. 4 is a block diagram of an example of cloud storage.
Figure 4:
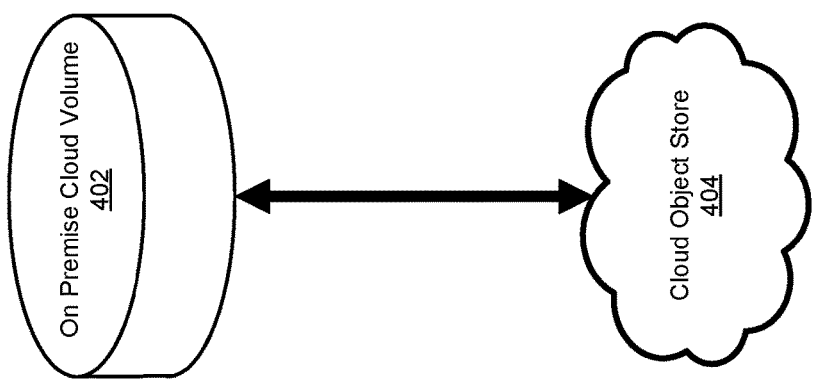

At step 304, reception module 106 may receive a command that is both formatted according to the operating system compatibility standard protocol and that also specifies a length and offset of the cloud storage. FIG. 4 shows an illustration 400 of an on premise cloud volume 402, which may correspond to the emulated local block storage device, and also a cloud object store 404, which may provide backend resources to emulate the on premise cloud volume 402. In the top-right portion of the figure, FIG. 4 also illustrates how on premise cloud volume 402 is laid out within a cloud object store 404 in terms of a series of "n" objects. The objects may have a uniform length, as further discussed above. Moreover, the uniform length may correspond to, or match exactly, a block length of the emulated local block storage device. In the specific example, an arbitrary volume (e.g., volume "2") has been divided into "n" objects stored within cloud object store 404. In the example of this figure, the objects are labeled with reference to the name of the volume (i.e., "Vol2") and also an incrementing number that increments to identify different objects within the volume. Accordingly, the different objects are labeled "Vol2_0," "Vol2_1," "Vol2_2," and "Vol2_n," etc.

In further examples, the translation service references objects in terms of both: (i) a unique number assigned to each respective object and (ii) an incrementing number assigned to each respective object that increments from object to object. An example of the incrementing number is shown in FIG. 4, as further discussed above. Additionally, in some examples, the unique number assigned to each respective object may include at least one of a globally unique identifier and/or a timestamp.

In some examples, assigning a unique number to each respective object may further include assigning the unique number as part of a name of the object. In essence, assigning the unique number as part of the name of the object effectively creates a new object within the object storage service. In more specific examples, the unique number or string may be appended to the name of the object, or otherwise inserted as part of the name of the object. Creating the new object, with a new and unique name (e.g., indicated by the unique number or other string) enables system 100 to benefit from the fact that object storage services generally provide strict consistency for newly created objects, whereas many object storage services only provide eventual consistency for overwriting PUT commands and/or DELETE commands. Accordingly, in these examples, by inserting the unique number or string as part of the unique name for the object, system 100 may effectively create a new object that will be processed in a manner that satisfies a strict consistency protocol rather than an eventual consistency protocol, as further discussed above.

Returning to step 304, reception module 106 may receive the command that specifies a length and offset of the cloud storage volume. In other words, the original command received by reception module 106 may, prior to translation by the translation service, specify a length that indicates a length across the entirety of the cloud storage volume, without reference to any objects, as further shown in FIG. 4. For example, if the block size of the emulated local block storage device is 1 MB, and the different objects shown in FIG. 4 have a fixed size of 1 MB accordingly, then the original command received by reception module 106 may, prior to translation by the translation service, specify a location at an offset 2.5 MB within the cloud storage volume simply using the offset "2.5 MB" rather than using the offset "0.5 MB" (which is the offset within the object "Vol2_2" as distinct from the offset within the overall cloud storage volume itself).

At step 306, one or more of the systems described herein may translate the command into a translated command formatted according to the cloud storage application programming interface protocol. For example, translation module 108 may, as part of computing device 202 in FIG. 2, translate command 256 into a translated command 258 formatted according to the cloud storage application programming interface protocol.

Translation module 108 may translate the command into a translated command in a variety of ways. In general, translation module 108 may operate in a manner that is transparent or invisible to a user or user account. In other words, translation module 108 may operate in a manner that emulates a local block storage device without revealing, or making apparent, the underlying translation process.

In some examples, the translation service within translation module 108 may translate a specific command formatted according to the operating system compatibility standard protocol into a command formatted according to the cloud storage application programming interface protocol. For example, the translation service may translate a read command of the POSIX protocol into a GET command of the RESTFUL API protocol, may translate a write command of the POSIX protocol into a PUT command of the RESTFUL API protocol, and/or may translate a reclaim command of the POSIX protocol into a DELETE command of the RESTFUL API protocol. These examples are merely illustrative, and the translation service may translate corresponding commands between any suitable local block storage interface protocol (or operating system compatibility standard protocol) and any suitable cloud storage application programming interface protocol, including derivatives and/or variance of the POSIX and/or RESTFUL protocols.

In these examples, commands formatted according to the operating system compatibility standard protocol may reference a volume, such as on premise cloud volume 402 shown in FIG. 4, which spans the entirety of the multiple objects shown in the top-right portion of FIG. 4. In contrast, commands formatted according to the cloud storage application programming interface protocol may reference one or more objects, which together form on premise cloud volume 402, but without referencing this volume itself.

At step 308, one or more of the systems described herein may translate the length and offset into information indicating a different length and offset in reference to at least one object within the cloud storage volume rather than referencing the cloud storage volume itself. For example, translation module 108 may, as part of computing device 202 in FIG. 2, translate the length and offset into information indicating a different length and offset in reference to at least one object within cloud storage volume 260 rather than referencing cloud storage volume 260 itself. As used herein, the term "different length and offset" generally refers to a length and offset that are together different than the original length and offset, even if one of the length and the offset remains the same.

Translation module 108 may translate the length and offset in a variety of ways. In general, if the specified data only spans a single object within the cloud storage volume, such as on premise cloud volume 402, then translation module 108 may simply translate the offset from an offset within on premise cloud volume 402 to an offset within the specific object that includes the specified data. In these examples, the translation module may keep the original length the same after translation. In terms of some concrete examples, translation module 108 may translate the original command "read (length: 1 MB, offset: 4 MB) on vol2" into the translated command "GET vol2_4 object (0, 1 MB)." Similarly, translation module 108 may translate the original command "read (length: 512 KB, offset: 8 MB) on vol2" into the translated command "GET (0, 512 KB) of vol2_8 object."

In some examples, the specific location within on premise cloud volume 402 specified by the original command may refer to an object that does not actually exist within cloud object store 404. Accordingly, translation module 108 may first check whether the corresponding object, as identified by the translated command, actually exists within cloud object store 404. In the case that the object actually does exist, then translation module 108 and/or returning module 110 may return data from the object that actually does exist. In contrast, in the case that the object does not actually exist, then translation module 108 and/or returning module 110 may return random and/or arbitrary data.

In further examples, the specified data may span multiple objects within the cloud storage volume. In these examples, translation module 108 may translate the original command into multiple corresponding translated commands, where each of the multiple corresponding translated commands specifies a different object. For example, translation module 108 may translate the original command "read (length: 2 MB, offset: 4 MB) on vol2" into both the translated command "GET vol2_4" and also the translated command "GET vol2-5 objects," because the original command refers to data that spans the entirety of two separate objects within cloud object store 404, and the two translated commands retrieve the entirety of both of these objects using corresponding GET commands. Similarly, translation module 108 may translate the original command "write (length: 2 MB, offset: 4 MB) on vol2" into both a translated command "PUT vol2_4" and "PUT vol2_5," because, again, the original command refers to data that spans the entirety of two separate objects within cloud object store 404, and the two translated commands are dated to the entirety of both of these objects using corresponding PUT commands. Of course, in the examples of write/PUT commands, the user or user account would also generally specify the data to be written to cloud object store 404 as a parameter of the original command.

In the example of a write command, translation module 108 may again check whether a corresponding object indicated by the original write command actually exists within cloud object store 404. For example, the original write command may be "write (length: 512 KB, offset: 4 MB) on vol2." In response, translation module 108 may first translate this original command into a translated command of "GET vol2_4 (0-1 MB)." In other words, translation module 108 may first retrieve all of the data within the specified object, as part of executing the write command (e.g., due to the fact that the original command references less than the entirety of the object). As part of requesting the entirety of the data within the specified object, translation module 108 may check whether that specified object already exists. If the specified object already exists, then translation module 108 may overwrite the portion of the retrieved data specified by the original command and then execute a corresponding PUT command to write the entirety of the object (i.e., the overwritten portion of the retrieved data and also the remainder of the retrieved data) to the existing object.

In contrast, if the specified object does not already exist, then translation module 108 may first create a buffer having the same size as the block/object size (e.g., in this example 1 MB). Then translation module 108 may write the data specified by the original command to the portion of the buffer specified by the length and offset of the original command. Translation module 108 may also fill the remainder of the buffer with zeros, random data, and/or arbitrary data. Subsequently, translation module 108 may translate the original command into a PUT command to write the entirety of the buffer to the corresponding (e.g., newly created) object. In the specific example discussed above, after translating the original command to the translated command "GET vol2_4 (0-1 MB)" translation module 108 may overwrite the first 512 KB within the data retrieved from the object (i.e., in the case that the object already exists) or (i) create the 1 MB buffer, (ii) fill the first 512 KB with user data, and (iii) fill the last 512 KB with zero/random/arbitrary data (i.e., in the case that the object does not already exist). In either case, translation module 108 may subsequently translate the original write command into a corresponding PUT command to write data to the entirety of the corresponding object (i.e., in this illustrative example "PUT vol2_4[.]"

In addition to conventional read/write commands, translation module 108 may also translate reclaim commands (e.g., reclamation commands) into one or more DELETE commands. In these examples, the reclaim command may refer to reclaiming data back to a storage system such that the storage system regards the corresponding storage space as unoccupied. Similarly, the reclaim command may refer to reclaiming storage space back to free space within a thin provisioning system.

In the example of reclaim commands, translation module 108 may only delete one or more objects indicated by the original command in the case that the original reclaim command specifies reclaiming data that spans the entirety of these objects. In other words, if the original command does not specify reclaiming the entirety of an object, then translation module 108 may not perform a DELETE command for that object, because omitting the DELETE command thereby preserves data within the remainder of the object so that the user, or user account, may subsequently still access the data.

Notably, as used herein, the term "information indicating a different length and offset in reference to at least one object" generally refers to an explicit length and/or an explicit offset or, instead, information that implies or indicates such a length and offset. For illustration purposes, the various examples above sometimes refer to RESTFUL API commands such as GET(vol2_4) and PUT(vol2_4). In these examples, the corresponding cloud storage is configured to interpret these commands as referring to a default offset of zero and a default length of the entire object. In other words, simple commands that refer to a single object, without specifying an alternative and explicit offset and length, implicitly refer to the default offset and length of the entire object.

At step 310, one or more of the systems described herein may return a result of executing the translated command that is formatted according to the cloud storage application programming interface protocol and that specifies, as a parameter, the information indicating the different length and offset in reference to the object within the cloud storage volume. For example, returning module 110 may, as part of computing device 202 in FIG. 2, return a result 270 of executing translated command 258 that is formatted according to the cloud storage application programming interface protocol and that specifies, as a parameter, the information indicating the different length and offset in reference to the object within cloud storage volume 260.

Returning module 110 may return a result 270 in a variety of ways. In general, returning module 110 may display, or output, data from result 270 to a user or user account. In the example of an original read command, returning module 110 may output the data fetched using the original read command and the translated GET command. In the example of an original write command or reclaim command, returning module 110 may simply output an indication that the original command was successfully executed.

In some examples, successfully executing the original command using the translated command may enable direct execution of at least one of the following commands on a volume manager (i) a mirroring command, (ii) a snapshot command, and/or (iii) an encryption command. In other words, one or more of these commands may have been previously unavailable due to the limitations of either the conventional local block storage device and/or conventional cloud storage.

As further discussed above, the disclosed subject matter may enable a customer of an enterprise data storage vendor to enjoy lower costs associated with remote cloud storage over the Internet while also preserving a user interface and application programming interface with which the customer is familiar when interacting with a local storage area network on premise. The disclosed subject matter may also provide one or more additional benefits to the customer, which are discussed in more detail above.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for emulating local storage, at least a portion of the method being performed by a computing device comprising at least one processor, the method comprising:
    exposing a cloud storage as a local block storage device by providing a translation service that translates commands formatted according to an operating system compatibility standard protocol into commands formatted according to a cloud storage application programming interface protocol, the cloud storage dividing a cloud storage volume into multiple objects;
    receiving a command that is formatted according to the operating system compatibility standard protocol and that specifies a length and offset of the cloud storage volume;
    translating the command into a translated command formatted according to the cloud storage application programming interface protocol;
    translating the length and offset into information indicating a different length and offset in reference to at least one object within the cloud storage volume rather than referencing the cloud storage volume itself; and
    returning a result of executing the translated command that is formatted according to the cloud storage application programming interface protocol and that specifies, as a parameter, the information indicating the different length and offset in reference to the object within the cloud storage volume;
    wherein:
    the cloud storage application programming interface protocol comprises the REPRESENTATIONAL STATE TRANSFER protocol;
    the command comprises an overwrite command to overwrite data of the object that is preexisting prior to the command;
    the cloud storage provides strict consistency for newly created objects and provides eventual consistency for overwrite commands;
    strict consistency for the overwrite command is achieved by inserting a unique string as part of a unique name for a new object to be created as a replacement for the object that is preexisting; and
    strict consistency specifies waiting to return an indication that the overwrite command was successful until after the overwrite command has been successfully performed on both an original node to which the overwrite command is directed and also a secondary node to which the overwrite command is being replicated.

2. The computer-implemented method of claim 1, wherein the operating system compatibility standard protocol comprises the PORTABLE OPERATING SYSTEM INTERFACE.

3. The computer-implemented method of claim 2, wherein the command that is formatted according to the operating system compatibility standard protocol comprises both a read command and the overwrite command.

4. The computer-implemented method of claim 1, wherein the operating system compatibility standard protocol comprises a variant of the PORTABLE OPERATING SYSTEM INTERFACE that was derived from the PORTABLE OPERATING SYSTEM INTERFACE.

5. The computer-implemented method of claim 2, wherein the command that is formatted according to the operating system compatibility standard protocol further comprises a reclaim command.

6. The computer-implemented method of claim 1, wherein the translated command formatted according to the cloud storage application programming interface protocol comprises a PUT command.

7. The computer-implemented method of claim 1, wherein translating the length and offset comprises translating the length and offset into both a second length and offset for a first object and a third length and offset for a second object.

8. The computer-implemented method of claim 1, wherein the cloud storage volume comprises a thin reclaimable volume.

9. The computer-implemented method of claim 1, wherein the cloud storage divides the cloud storage volume into multiple objects of uniform length.

10. The computer-implemented method of claim 9, wherein the uniform length of the multiple objects is identical to a block length of the local block storage device.

11. The computer-implemented method of claim 1, wherein the translation service enables direct execution of at least one of the following commands on a volume manager:
   a mirroring command;
   a snapshot command;
   an encryption command.

12. The computer-implemented method of claim 1, wherein the translation service is cloud storage agnostic such that the translation service is compatible with multiple cloud storage vendors.

13. The computer-implemented method of claim 1, wherein the translation service references objects in terms of a respective unique name assigned to each respective object.

14. The computer-implemented method of claim 13, wherein the translation service further references objects in terms of a respective incrementing number assigned to each respective object that increments from object to object.

15. The computer-implemented method of claim 14, wherein the respective unique name assigned to each respective object enables the cloud storage to provide data storage that satisfies a strict consistency protocol rather than an eventual consistency protocol.

16. The computer-implemented method of claim 1, wherein returning a result of executing a second translated command comprises checking whether an object referenced by the translated command exists.

17. The computer-implemented method of claim 16, wherein returning the result of executing the second translated command comprises returning random data in response to determining that a corresponding object referenced by the second translated command does not exist.

18. The computer-implemented method of claim 16, wherein returning the result of executing the second translated command comprises returning data fetched from a corresponding object referenced by the second translated command in response to determining that the corresponding object referenced by the second translated command does exist.

19. A system for emulating local storage, the system comprising:
   an exposure module, stored in memory, that exposes a cloud storage as a local block storage device by providing a translation service that translates commands formatted according to an operating system compatibility standard protocol into commands formatted according to a cloud storage application programming interface protocol, the cloud storage dividing a cloud storage volume into multiple objects;
   a reception module, stored in memory, that receives a command that is formatted according to the operating system compatibility standard protocol and that specifies a length and offset of the cloud storage volume;
   a translation module, stored in memory, that:
      translates the command into a translated command formatted according to the cloud storage application programming interface protocol;
      translates the length and offset into information indicating a different length and offset in reference to at least one object within the cloud storage volume rather than referencing the cloud storage volume itself;
   a returning module, stored in memory, that returns a result of executing the translated command that is formatted according to the cloud storage application programming interface protocol and that specifies, as a parameter, the information indicating the different length and offset in reference to the object within the cloud storage volume; and
   at least one physical processor configured to execute the exposure module, the reception module, the translation module, and the returning module;
   wherein:
   the cloud storage application programming interface protocol comprises the REPRESENTATIONAL STATE TRANSFER protocol;
   the command comprises an overwrite command to overwrite data of the object that is preexisting prior to the command;
   the cloud storage provides strict consistency for newly created objects and provides eventual consistency for overwrite commands;
   strict consistency for the overwrite command is achieved by inserting a unique string as part of a unique name for a new object to be created as a replacement for the object that is preexisting; and
   strict consistency specifies waiting to return an indication that the overwrite command was successful until after the overwrite command has been successfully performed on both an original node to which the overwrite command is directed and also a secondary node to which the overwrite command is being replicated.

20. A non-transitory computer-readable medium comprising one or more computer-readable instructions that, when executed by at least one processor of a computing device, cause the computing device to:
   expose a cloud storage as a local block storage device by providing a translation service that translates commands formatted according to an operating system compatibility standard protocol into commands formatted according to a cloud storage application programming interface protocol, the cloud storage dividing a cloud storage volume into multiple objects;

receive a command that is formatted according to the operating system compatibility standard protocol and that specifies a length and offset of the cloud storage volume;

translate the command into a translated command formatted according to the cloud storage application programming interface protocol;

translate the length and offset into information indicating a different length and offset in reference to at least one object within the cloud storage volume rather than referencing the cloud storage volume itself; and return a result of executing the translated command that is formatted according to the cloud storage application programming interface protocol and that specifies, as a parameter, the information indicating the different length and offset in reference to the object within the cloud storage volume;

wherein:

the cloud storage application programming interface protocol comprises the REPRESENTATIONAL STATE TRANSFER protocol;

the command comprises an overwrite command to overwrite data of the object that is preexisting prior to the command;

the cloud storage provides strict consistency for newly created objects and provides eventual consistency for overwrite commands;

strict consistency for the overwrite command is achieved by inserting a unique string as part of a unique name for a new object to be created as a replacement for the object that is preexisting; and strict consistency specifies waiting to return an indication that the overwrite command was successful until after the overwrite command has been successfully performed on both an original node to which the overwrite command is directed and also a secondary node to which the overwrite command is being replicated.

* * * * *